United States Patent
Boutros et al.

(10) Patent No.: US 12,170,582 B2
(45) Date of Patent: *Dec. 17, 2024

(54) BITMAP SIGNALING OF SERVICES USING SEGMENT ROUTING

(71) Applicant: Ciena Corporation, Hanover, MD (US)

(72) Inventors: Sami Boutros, Union City, CA (US); Muthurajah Sivabalan, Kanata (CA); Himanshu Shah, Hopkinton, MA (US); Peng He, East Brunswick, NJ (US)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,132

(22) Filed: Apr. 5, 2023

(65) Prior Publication Data

US 2023/0239176 A1 Jul. 27, 2023

Related U.S. Application Data

(63) Continuation of application No. 17/076,881, filed on Oct. 22, 2020, now Pat. No. 11,627,017.

(51) Int. Cl.
*H04L 12/46* (2006.01)
*H04L 45/00* (2022.01)
*H04L 45/16* (2022.01)
*H04L 45/50* (2022.01)

(52) U.S. Cl.
CPC ......... *H04L 12/4641* (2013.01); *H04L 45/16* (2013.01); *H04L 45/22* (2013.01); *H04L 45/50* (2013.01)

(58) Field of Classification Search
CPC ..... H04L 12/4641; H04L 45/16; H04L 45/22; H04L 45/50; H04L 12/4633; H04L 45/247
See application file for complete search history.

(56) References Cited

U.S. PATENT DOCUMENTS

| 8,295,278 B2 | 10/2012 | Shah et al. |
| 8,948,055 B2 | 2/2015 | Bragg |
| 9,531,627 B1 | 12/2016 | Alvarez et al. |
| 9,538,423 B2 | 1/2017 | Alvarez et al. |
| 9,979,629 B2 | 5/2018 | Sivabalan et al. |

(Continued)

FOREIGN PATENT DOCUMENTS

WO WO-2020021558 A1 * 1/2020

OTHER PUBLICATIONS

C. Filsfils et al., Spring Internet-Draft, Standards Track, Expires: Aug. 28, 2020, Network Programming extension: SRv6 uSID instruction draft-filsfils-spring-net-pgm-extension-srv6-usid-04, Feb. 25, 2020, pp. 1-14.

(Continued)

*Primary Examiner* — Donald L Mills
(74) *Attorney, Agent, or Firm* — Baratta Law PLLC; Lawrence A. Baratta, Jr.

(57) ABSTRACT

Systems and methods associated with a node in a Segment Routing network include, responsive to what services are support at a node in a Segment Routing network, creating a bitmap to represent the plurality of services supported at the node; and transmitting an advertisement with the bitmap such that the advertisement is a single advertisement of multiple services. This approach can reduce the advertisement of rout updates by orders of magnitude.

17 Claims, 4 Drawing Sheets

(56) References Cited

U.S. PATENT DOCUMENTS

| | | |
|---|---|---|
| 10,069,639 B2 | 9/2018 | Bragg et al. |
| 10,153,948 B2 | 12/2018 | Ong |
| 10,250,494 B2 | 4/2019 | Sivabalan et al. |
| 11,627,017 B2 * | 4/2023 | Boutros .................. H04L 45/16 370/254 |
| 11,824,772 B2 * | 11/2023 | Boutros .................. H04L 45/50 |
| 2015/0006757 A1 | 1/2015 | Boutros et al. |
| 2015/0288602 A1 | 10/2015 | Bragg et al. |
| 2016/0261497 A1 * | 9/2016 | Arisoylu ............. H04L 12/4633 |
| 2016/0380886 A1 | 12/2016 | Blair et al. |
| 2017/0048138 A1 | 2/2017 | Sivabalan et al. |
| 2017/0244631 A1 | 8/2017 | Guichard et al. |
| 2018/0083881 A1 * | 3/2018 | Li ....................... H04L 12/4662 |
| 2018/0109450 A1 * | 4/2018 | Filsfils ................... H04L 45/04 |
| 2018/0324090 A1 | 11/2018 | Duncan et al. |
| 2018/0375968 A1 | 12/2018 | Bashandy et al. |
| 2019/0132221 A1 | 5/2019 | Boutros et al. |
| 2019/0245787 A1 | 8/2019 | Skalecki et al. |
| 2020/0153732 A1 | 5/2020 | Negi et al. |
| 2021/0297891 A1 | 9/2021 | Berzin et al. |
| 2021/0352011 A1 | 11/2021 | Boutros et al. |

OTHER PUBLICATIONS

C. Filsfils et al., Spring Internet-Draft, Standards Track, Expires: Aug. 26, 2020, SRv6 Network Programming draft-ietf-spring-srv6-network-programming-10, Feb. 23, 2020, pp. 1-38.

A. Sajassi et al., Internet Engineering Task Force (IETF), Category: Informational, ISSN: 2070-1721, Requirements for Ethernet VPN (EVPN), May 2014, pp. 1-15.

A. Sajassi et al., Internet Engineering Task Force (IETF), Category: Standards Track, ISSN: 2070-1721, A Network Virtualization Overlay Solution Using Ethernet VPN (EVPN), Mar. 2018, pp. 1-33.

J. Rabadan et al., Internet Engineering Task Force (IETF), Category: Standards Track, ISSN: 2070-1721, Framework for Ethernet VPN Designated Forwarder Election Extensibility, Apr. 2019, pp. 1-32.

Aug. 19, 2021, International Search Report and Written Opinion for International Patent Application No. PCT/US2021/031283.

* cited by examiner

BITMAP SIGNALING OF SERVICES USING SEGMENT ROUTING

CROSS-REFERENCE TO RELATED APPLICATION(S)

The present disclosure is a continuation of U.S. patent application Ser. No. 17/076,881, filed Oct. 22, 2020, which will be U.S. Pat. No. 11,627,017, with an issue date of Apr. 11, 2023, the contents of each are incorporated by reference in their entirety.

FIELD OF THE DISCLOSURE

The present disclosure generally relates to networking. More particularly, the present disclosure relates to systems and methods for Virtual Private Wire Service (VPWS) signaling using Segment Routing.

BACKGROUND OF THE DISCLOSURE

EVPN technology is replacing the legacy Pseudowire (PW) technology for Layer 2 (L2)-Virtual Private LAN (Local Area Network) Service (VPLS) and Virtual Private Wire Service (VPWS). EVPN is described, e.g., in RFC 7209, "Requirements for Ethernet VPN (EVPN)," May 2014, RFC 7432, "BGP MPLS-Based Ethernet VPN," February 2015, and RFC 8365, "A Network Virtualization Overlay Solution Using Ethernet VPN (EVPN)," March 2018, the contents of each are incorporated by reference. EVPN uses Border Gateway Protocol (BGP) signaling to establish the EVPN instance (EVI) with BGP Peers to offer a multipoint-to-multipoint L2 Ethernet service for a given client. EVPN relies on learning the Internet Protocol (IP) and Media Access Control (MAC) address binding of the locally connected Customer Edges (CEs) and distributing this information in the BGP EVPN Protocol Data Units (PDUs) to remote Provider Edges (PEs) that are members of the established EVPN instance. That is, conventionally, EVPN utilizes BGP for control plane-based learning. In particular, BGP utilizes an EVPN Network Layer Reachability Information (NLRI), which includes a Route Type field that details the encoding of the EVPN NLRI. The Route Types include 1—Ethernet Auto-Discovery (A-D) route, 2—MAC/IP Advertisement route, 3—Inclusive Multicast Ethernet Tag route, and 4—Ethernet Segment route.

A Virtual Private Wire Service (VPWS) supports point-to-point services, appearing to an end customer like a leased line. Conventional implementations utilize Ethernet Virtual Private Network (EVPN) to implement VPWS, such as described in RFC 8214, "Virtual Private Wire Service Support in Ethernet VPN," August 2017, the contents of which are incorporated by reference. The conventional implementation of EVPN VPWS utilizes BGP overhead, including Route Distinguisher (RD) and Route Target (RT), for each EVPN route presenting a service. Of note, the existing overhead in EVPN VPWS is significant. Also, conventional EVPN VPWS does not benefit from Active/Active multi-homing.

BRIEF SUMMARY OF THE DISCLOSURE

The present disclosure relates to systems and methods for Virtual Private Wire Service (VPWS) signaling using Segment Routing. Specifically, the present disclosure utilizes Segment Routing for VPWS to greatly reduce the BGP overhead of the existing EVPN VPWS control plane by at least two orders of magnitude. The present disclosure utilizes a Segment Identifier (SID) label stack for a Point-to-Point (P2P) VPWS service between two network nodes. The SID label stack includes a destination node SID, a P2P service SID, and an optional Flexible Cross Connect (FXC) normalized Virtual Local Area Network Identifier (VID). In addition to a significant reduction in the overhead, the present disclosure includes bringing the benefit of A/A multihoming and multipathing for an MH site. This approach leverages the benefits of a Segment Routing anycast SID, for redundancy and fast convergence and to discover nodes sharing the same anycast SID to perform Designated Forwarder (DF) election, with no need at all for implementing any sort of convergence and redundancy at the overlay (EVPN/BGP or LDP) layer. Also, the present disclosure supports auto-discovery and single-sided service provisioning.

In various embodiments, the present disclosure includes a method implemented in in a Segment Routing network including steps, a router in a Segment Routing network configured to implement the steps, and a non-transitory computer-readable medium having instructions stored thereon for programming a router in a Segment Routing network to perform the steps. The steps include obtaining a plurality of services supported at the node; determining a bitmap to represent the plurality of services supported at the node, wherein the bitmap includes a starting service and each subsequent bit representing another service of the plurality of services and with each bit in the bitmap set based on the plurality of services supported at the node; and transmitting an advertisement to nodes in the Segment Routing network with the bitmap based on the plurality of services supported at the node.

The plurality of services each can include any of a Virtual Private Wire Service (VPWS) and a Flexible Cross Connect (FXC) service. The advertisement can include a Destination Segment Identifier (SID), a starting Service SID for the starting service, and the bit mask identifying service SIDs for one or more of Virtual Private Wire Service (VPWS) and Flexible Cross Connect (FXC) service instances supported by the advertising node based on the starting Service SID. The Destination SID can be any of a Node SID and an Anycast SID for multi-home nodes. For Active-Standby redundancy, the advertisement can include the Anycast SID with high cost for a backup. The steps can further include, for a packet associated with a given service, transmitting the packet with a Segment Identifier (SID) stack having a Destination SID identifying a destination and a Service SID identifying the given service. The Destination SID can be an Anycast SID for multi-home nodes.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for Virtual Private Wire Service (VPWS) signaling using Segment Routing. Specifically, the present disclosure utilizes Segment Routing for VPWS to greatly reduce the BGP overhead of the existing EVPN VPWS control plane by at least two orders of magnitude. The present disclosure utilizes a Segment Identifier (SID) label stack for a Point-to-Point (P2P) VPWS service between two network nodes. The SID label stack includes a destination node SID, a P2P service SID, and an optional Flexible Cross Connect (FXC) normalized Virtual Local Area Network Identifier (VID). In addition to a significant reduction in the overhead, the present disclosure includes bringing the benefit of A/A multihoming and multipathing for an MH site. This approach leverages the benefits of a Segment Routing anycast SID, for redundancy and fast convergence and to discover nodes sharing the same anycast SID to perform Designated Forwarder (DF) election, with no need at all for implementing any sort of convergence and redundancy at the overlay (EVPN/BGP or LDP) layer. Also, the present disclosure supports auto-discovery and single-sided service provisioning.

Acronyms

The following acronyms, abbreviations, and definitions are utilized herein:

| | |
|---|---|
| A/A | Active/Active; used synonymously with multi-active when a CE is multi-homed to two or more PEs |
| A/S | Active/Standby |
| BUM | Broadcast, Unknown Unicast, and Multicast |
| DP | Data Plane |
| DF | Designated Forwarder |
| EAD | Ethernet Auto Discovery Route |
| ECMP | Equal Cost Multi-Path |
| ES | Ethernet Segment; when a CE is MH to PEs via a LAG, MH (PE) peers identify LAG interface as Ethernet Segment |
| E-Tree | Ethernet Tree |
| EVPN | Ethernet VPN |
| EVI | Ethernet VPN Instance |
| FXC | Flexible Cross Connect |
| IP | Internet Protocol |
| LAG | Link Aggregation Group |
| LAN | Local Area Network |
| LDP | Label Distribution Protocol |
| MAC | Media Access Control |
| MH | Multi-home |
| NG-VPWS | Next Generation Virtual Private Wire Service |
| NG-VPLS | Next Generation Virtual Private LAN Service |
| P2P | Point-to-Point |
| PE | Provider Edge |
| PW | Pseudowire |
| RT | Route Target; EVPN uses BGP RTs with import/export policy to form EVI member group |
| SAFI | Subsequent Address Family Identifiers |
| SH | Split Horizon |
| SID | Segment Identifier |
| SRGB | Segment Routing Global Block |
| VLAN | Virtual Local Area Network |
| VPLS | Virtual Private LAN Service |
| VPN | Virtual Private Network |
| VPWS | Virtual Private Wire Service |

Segment Routing Overview

In loose source routing such as Segment Routing, a source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments that are instructions a node executes on an incoming packet. For example, segments can include forward the packet according to the shortest path to the destination, forward through a specific interface, or deliver the packet to a given application/service instance). Each Segment is represented by a Segment Identifier (SID).

In SR-MPLS, all SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SR-MPLS, SRGB is a local property of a node and identifies the set of local labels reserved for global segments. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by ISIS or OSPF. The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by an adjacency SID, which represents a specific adjacency, such as egress interface, to a neighboring router. The adjacency SID is distributed by ISIS or OSPF. The adjacency segment steers the traffic to a specific adjacency.

An anycast segment is a type of prefix segment that represents an anycast group. An anycast segment/SID is used for policies or protection. When forwarding traffic to an anycast SID, a node processing the forwarding will pick a device from the anycast group, which is the closest. If the closest device from the anycast group goes away, traffic will automatically switch to the next closest device in the anycast group.

SR-MPLS utilizes MPLS labels for the SID, whereas SRv6 utilizes an IPv6 address for a SID, i.e., when an SRv6 SID is in the Destination Address field of an IPv6 header of a packet, it is routed through an IPv6 network as an IPv6 address. Note, various example embodiments described herein are presented with reference to SR-MPLS, but those skilled in the art will recognize SRv6 is also contemplated.

A multicast SID represents a multicast segment that denotes the replication of the received packet. The implied interpretation of the Ethernet frame with multicast SID is that the received frame is of type BUM.

A service SID represents an EVPN service instance. It is an absolute MPLS label value that uniquely identifies an EVPN instance and is configured on all the PEs that are a member of that EVPN instance.

A broadcast service SID identifies the received packet on the service as BUM. It is an absolute MPLS label value and is configured on all the PEs that are a member of that EVPN instance.

A broadcast node SID is advertised by a node that identifies the BUM Ethernet payload. The broadcast node SID is common for all the EVPN instances configured on that node. All the SR nodes identify and process this SID, the same as node SID. The broadcast node SID is interchangeably referred to as "destination SID for BUM" or as "broadcast SID" in this document.

SR-Optimized VPWS+FXC Service Discovery

Figure 1:
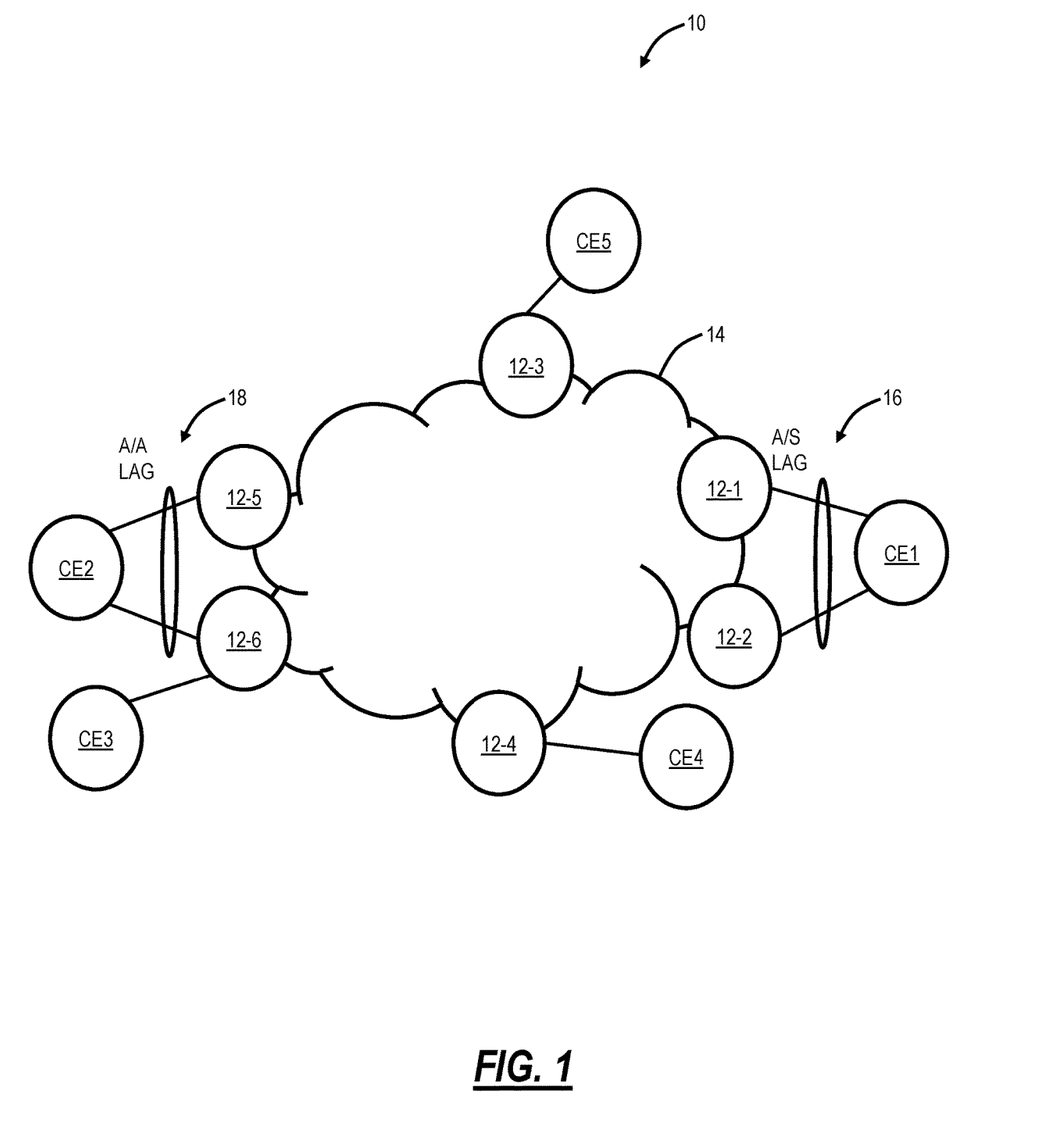
FIG. 1 is a network diagram of an example network including various nodes in a Segment Routing network as well as various Customer Edge (CE) nodes.

FIG. 1 is a network diagram of an example network 10, including various nodes 12 (labeled as nodes 12-1-12-6) in a Segment Routing network 14 as well as various Customer Edge (CE) nodes (labeled CE1-CE5). The CE nodes include a CE node CE2 in an Active/Active LAG 16, and a CE node CE1 in an Active/Standby LAG 18 configuration. Of note, those skilled in the art will recognize the network 10 is presented for illustration purposes, and various configurations are possible. The PE nodes 12 are configured to use SIDs associated with Segment Routing for MAC learning (i.e., which source (CE) MAC address in the received L2 packet is associated with which PE node (Source SID)), instead of using the EVPN Route Types 1, 2, 3 and 4.

A classical Pseudowire (PW) is a P2P service between two endpoints, e.g., CE2 to CE5, CE2 to CE1, CE4 to CE5, etc. Such a PW follows Layer 2 (L2) semantics and cannot support Active/Active redundancy or multipathing. The present disclosure includes NG-VPWS using Segment Routing to maintain the existing P2P PW semantics between two endpoints and provide active/Active Redundancy and multipathing using Segment Routing anycast SIDs. Further, the present disclosure greatly reduces the BGP overhead of the existing EVPN/VPWS control plane, and this approach does not take away the desired benefits of EVPN-VPWS, such as support of multi-active redundancy on access, multipathing in the core, auto-provisioning, and auto-discovery.

The present disclosure utilizes Segment Routing (SR) techniques to enable NG-VPWS services without maintaining a PW established via LDP/BGP or having to exchange EVPN route types 1 for per ES and per EVI. The following table illustrates contents for a P2P VPWS and/or FXC service advertisement. Note, the bitmap is a control plane attribute used to identify one or more of VPWS and/or FXC instances supported by a node sending the service advertisement, e.g., as a BGP update, an IGP update, and the like.

Destination SID-could be a Destination Node SID or an Anycast SID
Starting Service SID + bitmap The following table illustrates a SID stack for a P2P VPWS service or a FXC service (with the bottom being the Layer 2 (L2) packet for the P2P VPWS or the FXC service).

Destination SID-could be a Destination Node SID or an Anycast SID.
This can also be a stack of SIDs (e.g., for traffic-engineering purposes)
Service SID
L2 Packet Note, the Destination SID can be a Destination Node SID or an Anycast SID. It is also possible that the Destination SID is a stack of SIDs such as where a sender of the packet desires a specific path, such as for traffic-engineering purposes.

The Destination SID denotes the destination of the L2 packet, and it can be a Node SID or an Anycast SID. Here, each node 12 can advertise, via IGP/BGP, a (1) regular Node SID to be used by the node 12 when a VPWS service is attached to local Single-Home sites (e.g., the nodes 12-3, 12-4) and an (2) Anycast SID per Multi-Home site when the VPWS service is attached to the Multi-Home (MH) site (e.g., the nodes 12-1, 12-2 and the nodes 12-5, 12-6).

The Service SID can be referred to as a P2P SID, a VPWS Service SID, etc., and its function is to identify the VPWS service. Note, in a practical implementation, there can be tens of thousands of normalized VIDs or more between two service endpoints. In the conventional approach, tens of thousands of BGP EVPN EAD advertisements are required to signal the status of an ES. In the present disclosure, significantly fewer route updates are required.

A Service SID is signaled by IGP/BGP for service auto discovery, and the nodes 12 discover the VPWS services hosted on other nodes via IGP/BGP. For efficiency, the present disclosure contemplates the use of a bitmap for signaling. As is known in the art, a bitmap is a representation in which each bit in a sequence of bits corresponds to information, namely, a first-bit location corresponds to a specific start Service SID and each bit location that follows represents the following Service SIDs in sequence. Each bit in the bitmap is 1 to denote the inclusion of that Service SID or 0 to denote exclusion. This enables a single advertisement to include multiple Service SIDs, versus a single advertisement for each.

In an embodiment, an advertisement can include a start Service SID (e.g., 50) and a bitmap of Service SIDs that follows (e.g., bits after the Service SID 50 representing Service SIDs 51, 52, etc.). This can include thousands of Service SIDs in one advertisement. The Service SID can be from an SRGB range dedicated only for VPWS service.

In another embodiment, an advertisement can include one Service SID and a start of a normalized VID with the bitmap following of normalized VIDs. For an FXC service, VLAN aware, the normalized VLAN IDs (VIDs) can be presented by a bitmap of VLANs configured in association with the VPWS service SID. For example, there could be tens of thousands of normalized VIDs between two service endpoints. With the existing mechanism, tens of thousands of BGP EAD advertisements to signal the status of ES. With the proposed approach, one or a few route updates are sufficient.

In the example network 10, each of the nodes 12-1-12-6 will advertise the service SIDs for the services they are configured with via IGP/BGP, including using the bitmap to reduce the number of requirement advertisements. A node 12 receiving the advertisement can learn the services supported by the sender of the advertisement (auto-discovery). That is, the nodes 12 hosting VPWS services flood the service SIDs they are configured with in association with either the regular node SID for VPWS services associated with single home sites, or in association with an anycast SID per MH Site for VPWS services associated with this MH site via IGP/BGP. VPWS services attached to an MH site (nodes 12-1, 12-2 or nodes 12-5, 12-6) are advertised in one route containing the start SID and the bitmap of service SIDs configured on the MH site and will be associated with the MH site anycast SID. This mechanism obviates the need for per PW status signaling for EVPN VPWS, and BGP/LDP signaled VPWS. With this mechanism, withdrawing underlying anycast SID is sufficient.

SR-Optimized VPWS+FXC Service A/A or A/S

Figure 2:
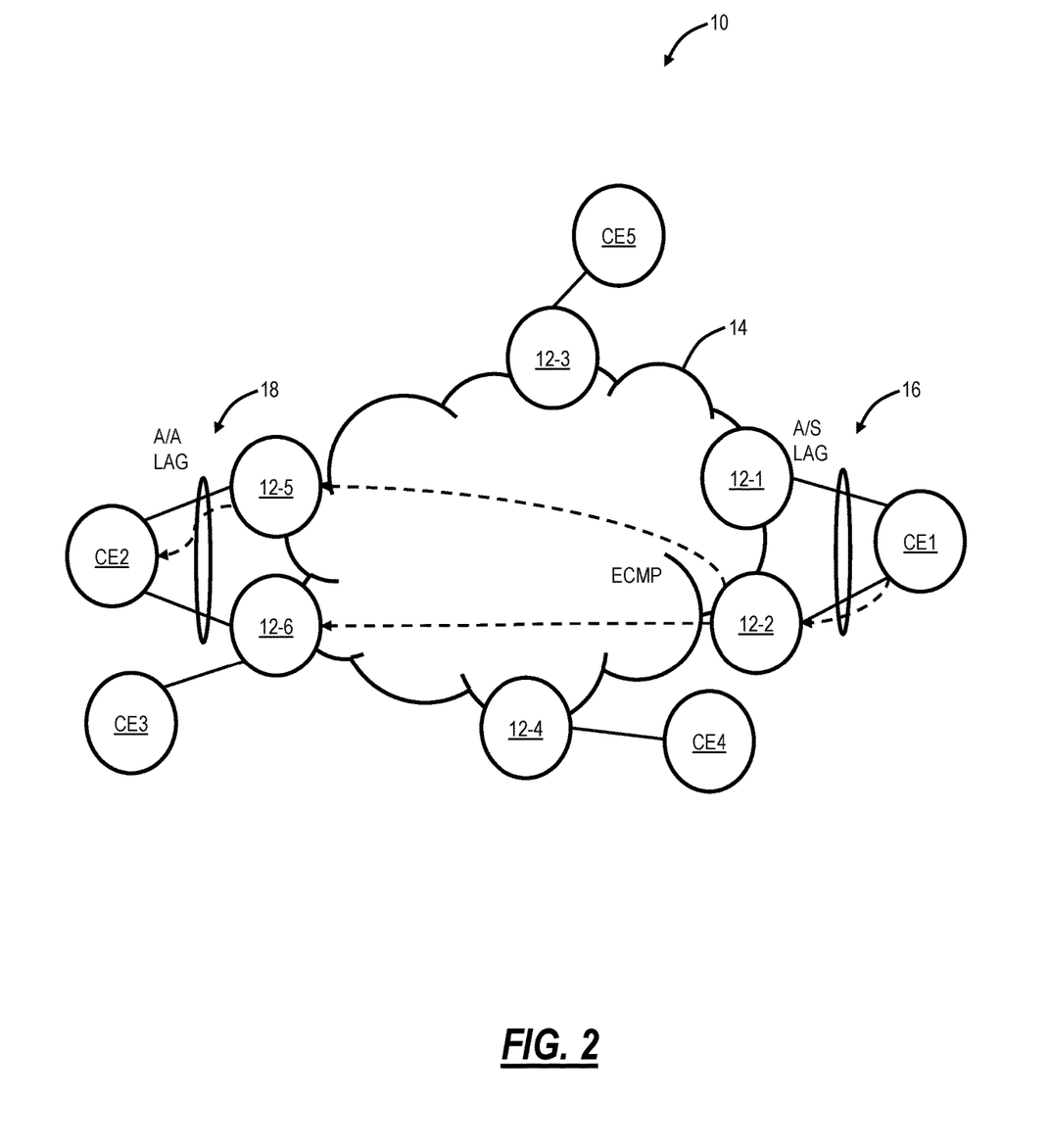
FIG. 2 is a network diagram of the example network for illustrating A/A or A/S redundancy.

Active/Active redundancy cannot be achieved by a traditional BGP/LDP signaled VPWS, and is possible only via EVPN VPWS. The present disclosure provides Active-Active redundancy without having to maintain BGP/LDP signaled backup PWs. This is achieved simply via anycast routes. FIG. 2 is a network diagram of the example network 10 for illustrating A/A or A/S redundancy. An Anycast SID per Ethernet Segment is configured on all nodes attached to an MH site and is advertised via IGP/BGP for other nodes to learn the reachability of the MAC address. Each node attached to the MH site will advertise the same anycast SID to allow other nodes to discover the membership.

In FIG. 2, packets destined to the MH CE2 connected to the nodes 12-5, 12-6 are load-balanced (ECMP/UCMP) between those nodes across the network given that the MAC addresses of the packets are learned via an anycast SID belonging to the nodes 12-5, 12-6.

Each node 12 attached to the MH site advertises the same anycast SID to allow other nodes 12 to discover the membership (auto-discovery). Also, VPWS services SIDs associated with an MH site are advertised as one route with start SID and a bitmap of SIDs and the associated anycast SID for this MH site. For FXC, a route containing the start normalized VID and the bitmap of VIDs in association with the VPWS service SID is advertised. Aliasing/Multipathing/Fast convergence achieved using the same mechanisms used for anycast SID.

For A/S, the backup node advertises the anycast SID with a cost of infinity (or arbitrarily large value) so that other nodes will direct traffic to the backup node only if the primary node goes down.

Benefits

The approach described herein greatly reduces the BGP Control Plane overhead of existing EVPN VPWS. For example, control plane messages will be at least two orders of magnitude less than current EVPN, and this removes the overhead of RDs and RTs associated with each EVPN route presenting a service. This approach enables the benefit of A/A multihoming and multipathing for the MH site. Again, the present disclosure leverages the benefits of Segment Routing anycast SID for redundancy and fast convergence to: discover nodes sharing the same anycast SID, perform DF election, and eliminate the need at all for implementing any sort of convergence and redundancy at the overlay (EVPN/BGP or LDP) layer. Also, the approach supports auto-discovery and single-sided service provisioning.

Interworking

Interworking between old and new technologies is via a gateway (GW) that understands both old and new technologies. For the gateway, the interworking working function can reside on any node that can act as a GW converting control plane messages from/to old/new technologies and communicating with nodes supporting only either old or new technologies. A node 12 can support the old technologies and act as the GW to distribute the routes coming from L2VPN SAFI or EVPN to peers understanding the new technologies and vice-versa (it is bidirectional, from/to old/new), this is what EVPN did to interwork with LPVPN old SAFI stuff.

Segment Routing VPWS Process

Figure 3:
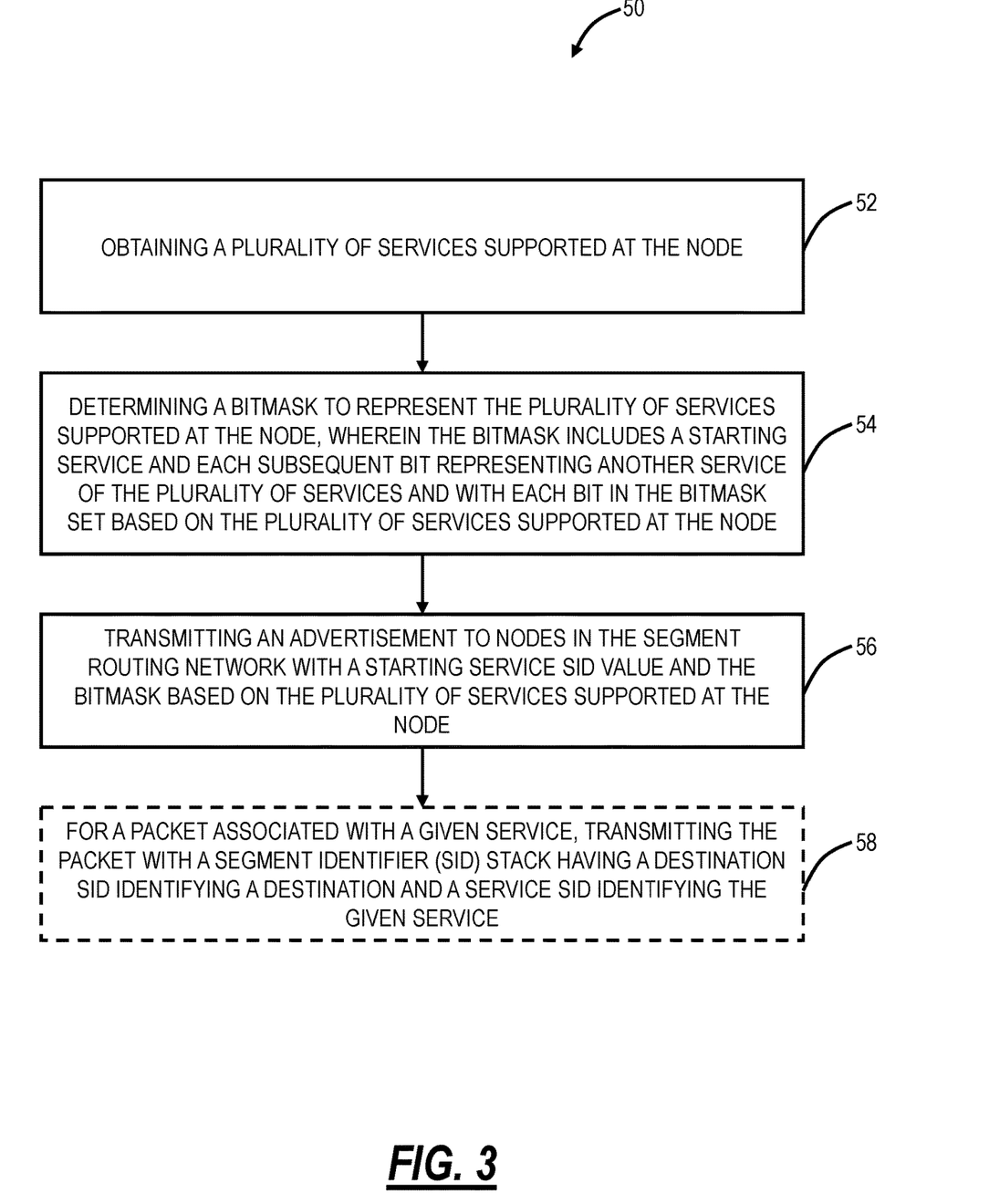
FIG. 3 is a flowchart of a Segment Routing VPWS process.

FIG. 3 is a flowchart of a Segment Routing VPWS process 50. The process 50 can be implemented as a method having steps, via the node 12 configured to implement the steps, and as instructions stored on a non-transitory computer-readable medium for programming a device to perform the steps.

The steps include obtaining a plurality of services supported at the node (step 52); determining a bitmap to represent the plurality of services supported at the node, wherein the bitmap includes a starting service and each subsequent bit representing another service of the plurality of services and with each bit in the bitmap set based on the plurality of services supported at the node (step 54); and transmitting an advertisement to nodes in the Segment Routing network with a starting Service SID value and the bitmap based on the plurality of services supported at the node (step 56). The starting Service SID value corresponds to a first SID value in the bitmap and the subsequent bits represent other Service SIDs with their values relative to the starting Service SID value. The steps can also include, for a packet associated with a given service, transmitting the packet with a Segment Identifier (SID) stack having a Destination SID identifying a destination and a Service SID identifying the given service (step 58). Note, the term SID stack is used herein to note this can be SRv6-based or SR-MPLS-based.

The plurality of services can each include any of a Virtual Private Wire Service (VPWS) and a Flexible Cross Connect (FXC) service. The advertisement can include a Segment Identifier (SID) label stack having a Destination SID, a Service SID, and the bitmap. The advertisement can include a Segment Identifier (SID) label stack having a Destination SID, a Service SID, and the bitmap. The Destination SID can be any of a Node SID and an Anycast SID for multi-home nodes. The node can be in a multi-home configuration for a service, and wherein the advertisement includes an Anycast SID for the node supporting the service. For Active-Standby redundancy, the advertisement can include the Anycast SID with a high cost for a backup.

Example Node

Figure 4:
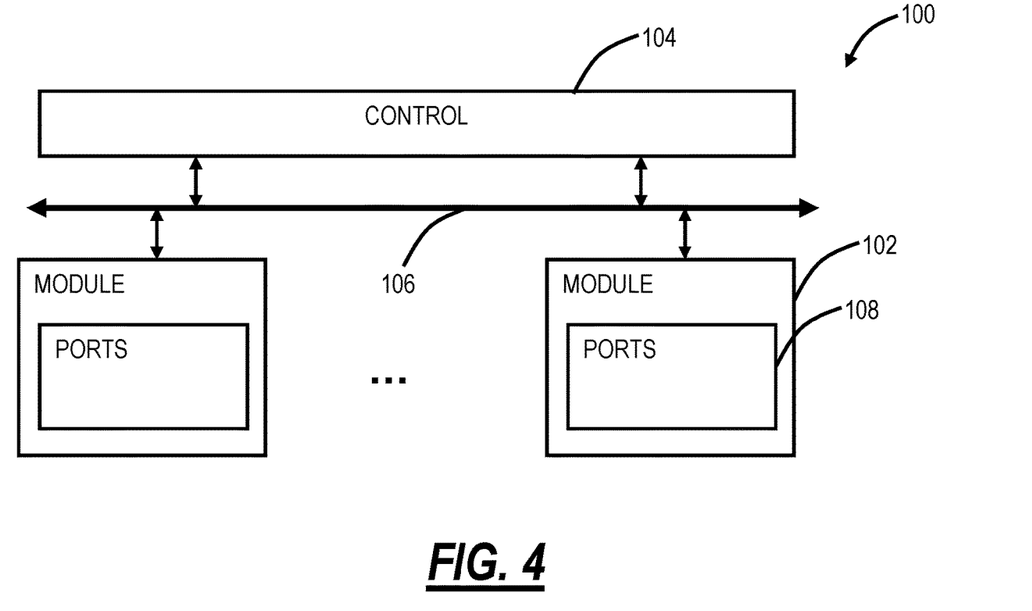
FIG. 4 is a block diagram of an example implementation of a node, such as for the node in the network and the Segment Routing network of FIGS. 1 and 2.

FIG. 4 is a block diagram of an example implementation of a node 100, such as for the node 12 in the network 10 and the Segment Routing network 14. Those of ordinary skill in the art will recognize FIG. 4 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, the SR controller 16, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 4 is meant to provide a functional view, and those of ordinary skill in the art will recognize actual hardware implementations may vary.

Example Controller

Figure 5:
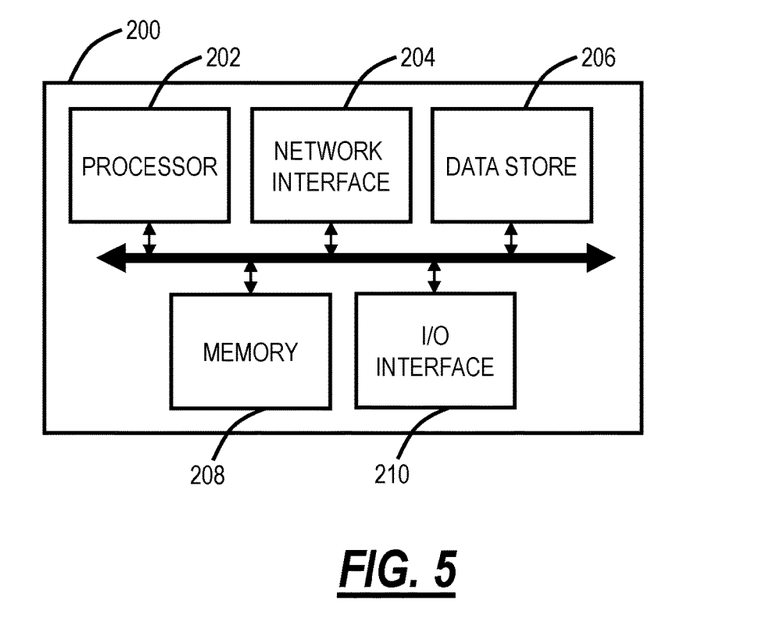
FIG. 5 is a block diagram of an example controller, which can form a controller for the node of FIG. 4.

FIG. 5 is a block diagram of an example controller 200, which can form a controller for the node 12. The controller 200 can be part of the node 12 or a stand-alone device communicatively coupled to the node 100. Also, the controller 200 can be referred to in implementations as a control module, a shelf controller, a shelf processor, a system controller, etc. The controller 200 can include a processor 202, which is a hardware device for executing software instructions. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 204 can be used to enable the controller 200 to communicate on a data communication network, such as to communicate to a management system, to the nodes 12, 100, and the like. The network interface 204 can include, for example, an Ethernet module. The network interface 204 can include address, control, and/or data connections to enable appropriate communications on the network. The data store 206 can store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a node in a Segment Routing network to perform steps of:
responsive to what services are support at the node, creating a bitmap to represent the plurality of services supported at the node; and
transmitting an advertisement with the bitmap such that the advertisement is a single advertisement of multiple services,
wherein the bitmap includes a first-bit location that corresponds to a specific start representing a first service and each bit location that follows represents following services in sequence, and wherein each bit in the bitmap is set based on the services that are supported at the node.

2. The non-transitory computer-readable medium of claim 1, wherein the first-bit location corresponds to a first service Segment Identifier (SID) and each bit location that follows represents following service SIDs in sequence.

3. The non-transitory computer-readable medium of claim 1, wherein the first-bit location corresponds to a first normalized Virtual Local Area Network Identifier (VID) and each bit location that follows represents following VIDs in sequence.

4. The non-transitory computer-readable medium of claim 1, wherein the plurality of services each include any one of a Virtual Private Wire Service (VPWS) and a Flexible Cross Connect (FXC) service.

5. The non-transitory computer-readable medium of claim 1, wherein the transmitting is via one of Interior Gateway Protocol (IGP) and Border Gateway Protocol (BGP).

6. The non-transitory computer-readable medium of claim 1, wherein the advertisement is a Border Gateway Protocol (BGP) Ethernet Virtual Private Network (EVPN) advertisement.

7. A method comprising:
responsive to what services are support at a node in a Segment Routing network, creating a bitmap to represent the plurality of services supported at the node; and
transmitting an advertisement with the bitmap such that the advertisement is a single advertisement of multiple services,
wherein the bitmap includes a first-bit location that corresponds to a specific start representing a first service and each bit location that follows represents following services in sequence, and wherein each bit in the bitmap is set based on the services that are supported at the node.

8. The method of claim 7, wherein the first-bit location corresponds to a first service Segment Identifier (SID) and each bit location that follows represents following service SIDs in sequence.

9. The method of claim 7, wherein the first-bit location corresponds to a first normalized Virtual Local Area Network Identifier (VID) and each bit location that follows represents following VIDs in sequence.

10. The method of claim 7, wherein the plurality of services each include any one of a Virtual Private Wire Service (VPWS) and a Flexible Cross Connect (FXC) service.

11. The method of claim 7, wherein the transmitting is via one of Interior Gateway Protocol (IGP) and Border Gateway Protocol (BGP).

12. The method of claim 7, wherein the advertisement is a Border Gateway Protocol (BGP) Ethernet Virtual Private Network (EVPN) advertisement.

13. An apparatus comprising circuitry configured to:
responsive to what services are support at a node in a Segment Routing network, create a bitmap to represent the plurality of services supported at the node, and
transmit an advertisement with the bitmap such that the advertisement is a single advertisement of multiple services,
wherein the bitmap includes a first-bit location that corresponds to a specific start representing a first service and each bit location that follows represents following services in sequence, and wherein each bit in the bitmap is set based on the services that are supported at the node.

14. The apparatus of claim 13, wherein the first-bit location corresponds to a first service Segment Identifier (SID) and each bit location that follows represents following service SIDs in sequence.

15. The apparatus of claim 13, wherein the b first-bit location corresponds to a first normalized Virtual Local Area Network Identifier (VID) and each bit location that follows represents following VIDs in sequence.

16. The apparatus of claim 13, wherein the plurality of services each include any one of a Virtual Private Wire Service (VPWS) and a Flexible Cross Connect (FXC) service.

17. The apparatus of claim 13, wherein the transmitting is via one of Interior Gateway Protocol (IGP) and Border Gateway Protocol (BGP).

* * * * *